US010253916B2

(12) United States Patent
Tjader

(10) Patent No.: US 10,253,916 B2
(45) Date of Patent: Apr. 9, 2019

(54) PIPE REPLACEMENT SYSTEM

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

(21) Appl. No.: 15/859,120

(22) Filed: Dec. 29, 2017

(65) Prior Publication Data

US 2018/0119867 A1    May 3, 2018

Related U.S. Application Data

(63) Continuation of application No. 14/679,384, filed on Apr. 6, 2015, now Pat. No. 9,885,441, which is a continuation of application No. 13/722,004, filed on Dec. 20, 2012, now Pat. No. 8,998,538.

(60) Provisional application No. 61/577,951, filed on Dec. 20, 2011.

(51) Int. Cl.
| F16L 55/18 | (2006.01) |
| F16L 1/032 | (2006.01) |
| B65H 75/40 | (2006.01) |
| F16L 55/165 | (2006.01) |
| F16L 1/028 | (2006.01) |

(52) U.S. Cl.
CPC .............. *F16L 55/18* (2013.01); *B65H 75/40* (2013.01); *F16L 1/028* (2013.01); *F16L 1/032* (2013.01); *F16L 55/1658* (2013.01)

(58) Field of Classification Search
CPC . F16L 1/024; F16L 1/028; F16L 1/032; F16L 55/18; B65H 75/40; B65H 75/4418; B65H 75/4457; B65H 75/4478; B65H 2701/33

USPC ............... 405/184.1, 184.2, 184.3
See application file for complete search history.

(56) References Cited

U.S. PATENT DOCUMENTS

| 3,934,647 A * | 1/1976 | Bokenkamp ........ E21B 43/013 166/347 |
| 4,309,128 A * | 1/1982 | Williams ............. E03F 3/06 138/97 |
| 4,340,322 A * | 7/1982 | Springett ............ F16L 1/203 405/154.1 |
| 4,674,914 A | 6/1987 | Wayman et al. |
| 4,719,991 A * | 1/1988 | Diehn .................. B65H 75/38 137/355.26 |
| 4,738,565 A | 4/1988 | Streatfield et al. |
| 4,745,879 A * | 5/1988 | Shishkin ........... B28B 19/0023 118/105 |

(Continued)

OTHER PUBLICATIONS

"U.S. Appl. No. 13/722,004, Advisory Action dated Sep. 4, 2014", 3 pgs.

(Continued)

*Primary Examiner* — Frederick L Lagman
(74) *Attorney, Agent, or Firm* — Schwegman Lundberg & Woessner, P.A.

(57) ABSTRACT

Pipe replacement devices, and systems are shown. Devices and systems may include jointed cutters and floating cutters to navigate difficult pipe replacement conditions. Devices and systems may also include replacement pipe with pre-installed supply hoses, such as lubricant supply and/or pneumatic supply hoses. Methods of pipe replacement are also described, including splitting old pipe and pulling in new pipe behind the equipment as splitting progresses.

10 Claims, 6 Drawing Sheets

(56) References Cited

U.S. PATENT DOCUMENTS

| | | | |
|---|---|---|---|
| 4,776,370 A * | 10/1988 | Long, Jr. | F16L 55/1651 |
| | | | 138/109 |
| 4,930,542 A | 6/1990 | Winkle et al. | |
| 4,983,071 A | 1/1991 | Fisk et al. | |
| 5,076,731 A | 12/1991 | Luksch | |
| 5,078,546 A | 1/1992 | Fisk et al. | |
| 5,112,158 A | 5/1992 | Mcconnell | |
| 5,482,404 A | 1/1996 | Tenbusch, II et al. | |
| 5,544,977 A | 8/1996 | Cravy et al. | |
| 5,628,585 A | 5/1997 | Parish, II et al. | |
| 5,636,648 A * | 6/1997 | O'Brien | B08B 9/04 |
| | | | 134/107 |
| 5,782,311 A | 7/1998 | Wentworth | |
| 5,876,152 A | 3/1999 | Hesse | |
| 5,984,582 A * | 11/1999 | Schwert | E21B 23/00 |
| | | | 138/97 |
| 6,039,505 A | 3/2000 | Tenbusch, II | |
| 6,092,553 A | 7/2000 | Hodgson | |
| 6,357,967 B1 | 3/2002 | Putnam | |
| 6,382,877 B1 | 5/2002 | Hodgson | |
| 6,588,983 B1 | 7/2003 | Tenbusch, II | |
| 6,969,216 B2 * | 11/2005 | Driver | F16L 55/1651 |
| | | | 138/97 |
| 6,969,427 B1 * | 11/2005 | Noles, Jr. | B05C 7/08 |
| | | | 118/317 |
| 7,086,808 B2 | 8/2006 | Wentworth et al. | |
| 7,384,214 B2 | 6/2008 | Tjader | |
| 7,398,797 B2 * | 7/2008 | Kamiyama | F16L 55/179 |
| | | | 138/97 |
| 7,578,636 B2 | 8/2009 | Tjader | |
| 7,624,817 B2 | 12/2009 | Putnam | |
| 7,641,756 B2 * | 1/2010 | Schwert | B29C 63/36 |
| | | | 118/306 |
| 8,328,468 B2 | 12/2012 | Tjader | |
| 8,403,250 B1 * | 3/2013 | Callahan | B65H 75/403 |
| | | | 137/355.26 |
| 8,414,225 B2 | 4/2013 | Tjader | |
| 8,596,918 B2 | 12/2013 | Tjader | |
| 8,998,538 B2 | 4/2015 | Tjader | |
| 9,885,441 B2 | 2/2018 | Tjader | |
| 2002/0102136 A1 * | 8/2002 | Holland | B08B 9/049 |
| | | | 405/184.1 |
| 2003/0178520 A1 * | 9/2003 | Wivagg | B65H 75/4449 |
| | | | 242/378.2 |
| 2004/0228691 A1 | 11/2004 | Tjader | |
| 2004/0238675 A1 * | 12/2004 | Banaszkiewicz | B65H 75/4402 |
| | | | 242/377 |
| 2005/0051344 A1 * | 3/2005 | Goss | F16L 55/165 |
| | | | 166/384 |
| 2006/0088384 A1 * | 4/2006 | Putnam | F16L 55/1658 |
| | | | 405/184.1 |
| 2007/0036613 A1 | 2/2007 | Tjader | |
| 2007/0048091 A1 | 3/2007 | Tjader | |
| 2009/0285635 A1 | 11/2009 | Tjader | |
| 2010/0150659 A1 * | 6/2010 | Kamiyama | B29C 63/36 |
| | | | 405/184.2 |
| 2010/0178113 A1 | 7/2010 | Tjader | |
| 2011/0081205 A1 | 4/2011 | Tjader | |
| 2011/0081206 A1 | 4/2011 | Tjader | |
| 2013/0156507 A1 | 6/2013 | Tjader | |
| 2015/0211672 A1 | 7/2015 | Tjader | |
| 2015/0337895 A1 * | 11/2015 | Bauck | B65H 75/4478 |
| | | | 137/355.26 |

OTHER PUBLICATIONS

"U.S. Appl. No. 13/722,004, Advisory Action dated Sep. 30, 2014", 3 pgs.
"U.S. Appl. No. 13/722,004, Final Office Action dated Jun. 18, 2014", 6 pgs.
"U.S. Appl. No. 13/722,004, Non Final Office Action dated Jan. 15, 2014", 7 pgs.
"U.S. Appl. No. 13/722,004, Notice of Allowance dated Dec. 4, 2014", 5 pgs.
"U.S. Appl. No. 13/722,004, Response filed Apr. 15, 2014 to Non Final Office Action dated Jan. 15, 2014", 8 pgs.
"U.S. Appl. No. 13/722,004, Response filed Aug. 18, 2014 to Final Office Action dated Jun. 18, 2014", 9 pgs.
"U.S. Appl. No. 13/722,004, Response filed Sep. 18, 2014 to Final Office Action dated Jun. 18, 2014", 8 pgs.
"U.S. Appl. No. 14/679,384, Advisory Action dated Jul. 10, 2017", 3 pgs.
"U.S. Appl. No. 14/679,384, Final Office Action dated Apr. 19, 2017", 8 pgs.
"U.S. Appl. No. 14/679,384, Final Office Action dated May 31, 2016", 9 pgs.
"U.S. Appl. No. 14/679,384, Non Final Office Action dated Oct. 21, 2016", 8 pgs.
"U.S. Appl. No. 14/679,384, Non Final Office Action dated Dec. 14, 2015", 11 pgs.
"U.S. Appl. No. 14/679,384, Notice of Allowance dated Sep. 25, 2017", 5 pgs.
"U.S. Appl. No. 14/679,384, Response filed Jan. 23, 2017 to Non-Final Office Action dated Oct. 21, 2016", 6 pgs.
"U.S. Appl. No. 14/679,384, Response filed Jun. 19, 2017 to Final Office Action dated Apr. 19, 2017", 7 pgs.
"U.S. Appl. No. 14/679,384, Response filed Mar. 14, 2016 to Non-Final Office Action dated Dec. 14, 2015", 9 pgs.
"U.S. Appl. No. 14/679,384, Response filed Sep. 30, 2016 to Final Office Action dated May 31, 2016", 8 pgs.

* cited by examiner

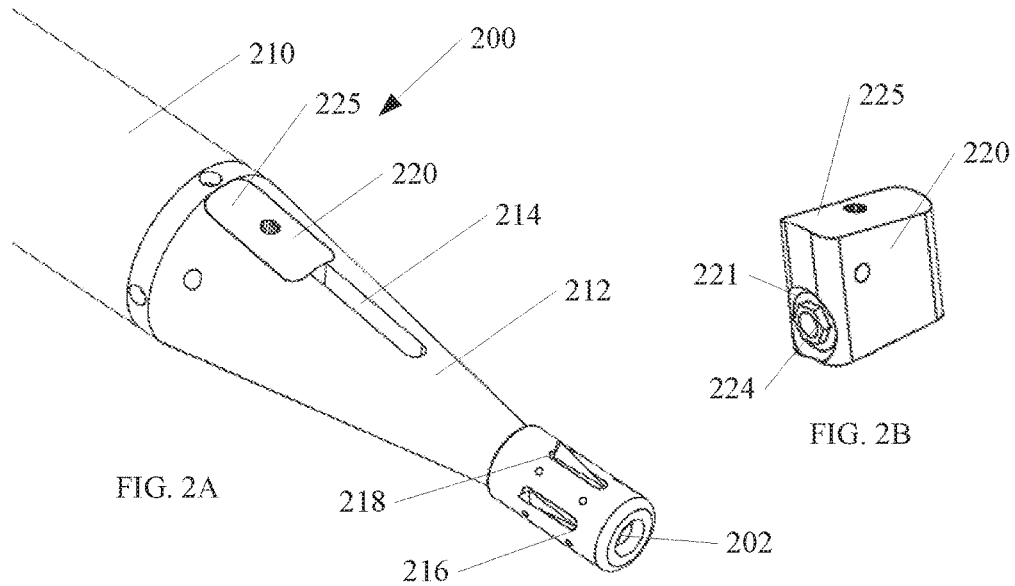
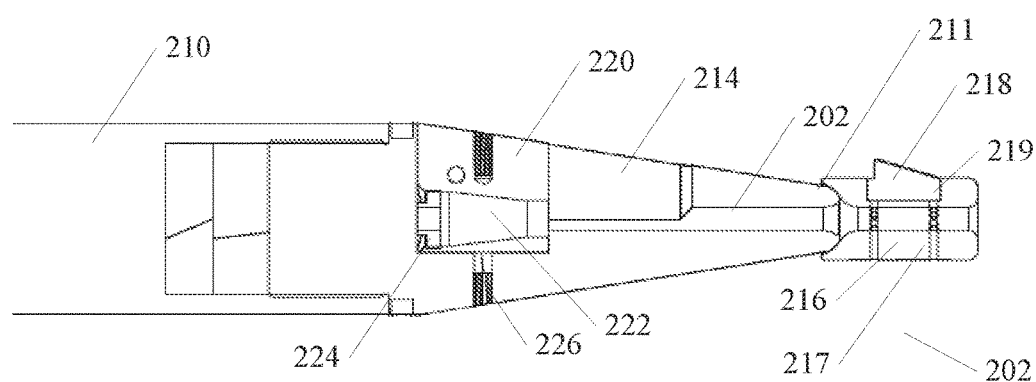

PIPE REPLACEMENT SYSTEM

PRIORITY

This application is Continuation of U.S. patent application Ser. No. 14/679,384, filed Apr. 6, 2015, which is a Continuation of U.S. patent application Ser. No. 13/722,004, filed Dec. 20, 2012, which is a Non Provisional of and claims the benefit of priority under 35 U.S.C. Section 119(e), to U.S. Provisional Patent Application Ser. No. 61/577,951, filed on Dec. 20, 2011, which is hereby incorporated by reference herein in its entirety.

BACKGROUND

Trenchless pipe replacement is useful for replacement of pipes without the need to excavate the length of the pipe to be replaced. An example of trenchless pipe replacement includes pulling a cutting blade with an expander through the pipe to be replaced, and attaching a new pipe behind the cutting blade. The pipe to be replaced is split, and pushed into the surrounding soil, and the new pipe, of equal or larger diameter, is pulled into the new space within the split pipe. Splitter are commonly used for small diameter pipes, and for pipes of a material that lends itself to splitting. Another example of trenchless pipe replacement includes pipe bursting.

Gas lines are one example of pipes where splitting is useful in pipe replacement. An example includes high density polyethylene (HDPE) gas pipe. Large quantities of 2 inch diameter HDPE gas pipes are currently in need of replacement. 300 miles of gas pipe in a single city in need of replacement is not uncommon. Given the desirability of minimizing trenches, it is also desirable to minimize the size of entry and exit pits for operating trenchless equipment. Cutting pipes in small entry and exit pits can be a challenge due to the small amount of available space to operate cutting tooling.

BRIEF DESCRIPTION OF THE DRAWINGS

FIG. 2A shows a pipe replacement device according to an embodiment of the invention.

FIG. 2B shows an anchor block from FIG. 2A according to an embodiment of the invention.

FIG. 3 shows a cross section of the pipe replacement device from FIG. 2A according to an embodiment of the invention.

DETAILED DESCRIPTION

Figure 1:
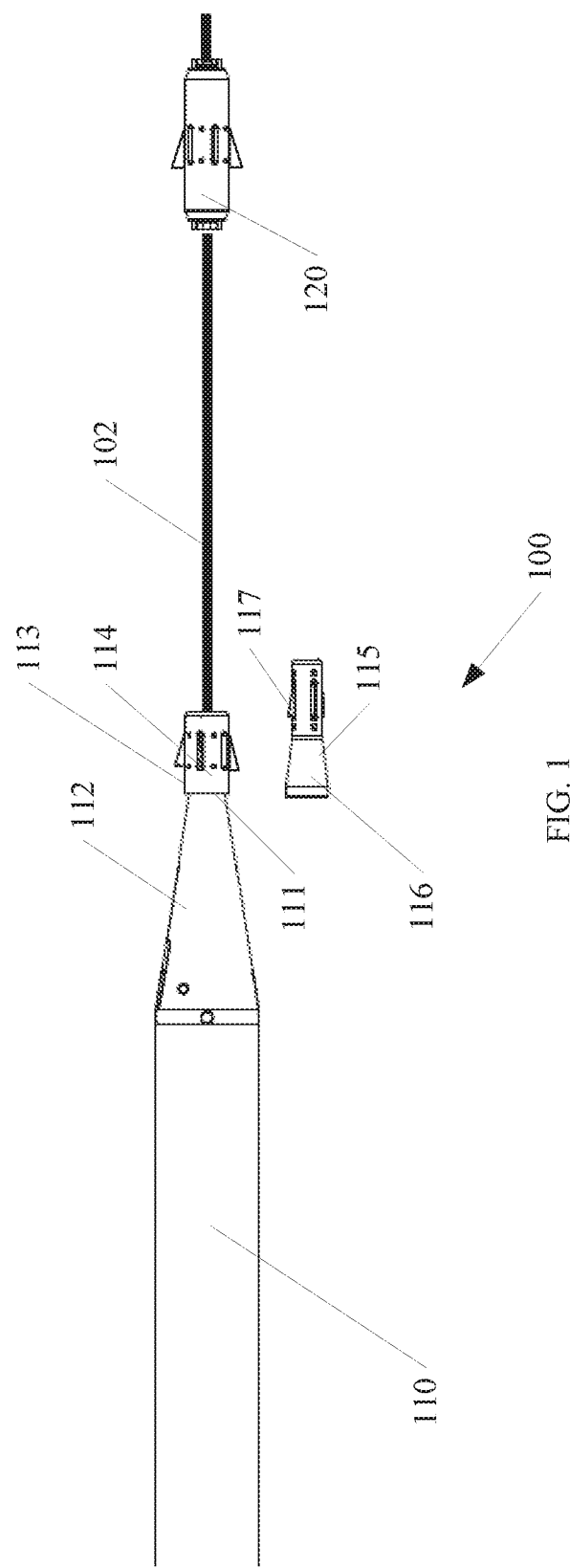
FIG. 1 shows a pipe replacement device according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and mechanical, structural, or logical changes, etc. may be made without departing from the scope of the present invention.

FIG. 1 shows a pipe replacement device 100 according to an embodiment of the invention. The pipe replacement device 100 includes an expander 112 located at a front portion of a reciprocating hammer 110. A towing cable 102 is also shown coupled to a front end 113 of the expander 112. In one example, a combination of pushing forces from behind, provided by the reciprocating hammer 110, and pulling forces provided by the towing cable 102 are used to split the pipe to be replaced, and to pull in a new pipe in a trenchless replacement operation. Although a conical expander 112 is shown, other expanders may include offset, non concentric expanders. The term towing cable 102 includes any of a variety of towing structures, such as wire rope, or other flexible lines of sufficient strength.

A cutter 114 is shown coupled to the front end 113 of the expander 112. In one example, the cutter 114 includes a jointed cutter that is allowed to pivot at the front end 113 of the expander 112. In one example, a ball joint 111 is included between the cutter 114 and the expander 112 to better navigate the pipe replacement device 100 through a pipe to be replaced. One particularly useful example is in trenchless replacement of polymeric pipe, such as buried natural gas lines.

In selected operations, such as splitting some types of polymeric pipe, a jointed cutter is advantageous. For example, selected polymeric pipe was placed in the ground by unrolling the pipe off a spool and loosely laying the pipe in a trench. When the pipe is later covered with dirt, a number of small curves may remain in the pipe as a result of shape memory from the spool which the pipe was unrolled from. These small curves can be difficult to navigate in a subsequent splitting operation of a trenchless replacement operation.

In one example, the ball joint 111 between the cutter 114 and the expander 112 is held together by pressure, and aligned by the towing cable 102. This configuration also makes modular substitution of components of the pipe replacement device 100. For example, a second cutter 116 is shown as an optional component for use with smaller diameter pipe. In one example, the second cutter 116 includes a tapered portion 115 that bridges a taper dimension between the cutter blades 117 and the starting diameter of the expander 112.

In one example, a floating cutter 120 is included in the pipe replacement device 100. FIG. 1 shows the floating cutter 120 in an embodiment that also includes a ball joint 111 and a cutter 114. Other configurations may include only a ball joint 111 and a cutter 114, or only a floating cutter 120.

The floating cutter 120 allows great flexibility to split and/or weaken the pipe to be replaced ahead of the expander 112 and reciprocating hammer 110. Because the floating cutter is only constrained by the flexible towing cable 102, the floating cutter 120 more easily navigates curves in the pipe to be replaced, such as an uncoiled polymeric pipe as described above. Further, the floating cutter 120 is not constrained at the front of the expander 112 in the way that the cutter 114 is constrained. Because the floating cutter 120 is not coupled to a ball joint, or other joint, the only constraint on the floating cutter 120 is its connection to the towing cable 102. One technical challenge with trenchless replacement in curvy pipes is the length of the reciprocating hammer 110 which tends to direct the expander in a straight line. The addition of the floating cutter 120 in front of the expander 112 and reciprocating hammer 110 overcomes this challenge.

FIG. 2A shows a pipe replacement device 200 similar to the pipe replacement device 100 of FIG. 1. The pipe replacement device 200 includes an expander 212 coupled to a front end of a reciprocating hammer 210. Similar to the pipe replacement device 100 of FIG. 1, a cutter 216 is shown with a number of cutting blades 218 attached. An opening 202 to accept a towing cable is shown that passes through the cutter 216, and into the expander 212.

A lateral insertion pocket 214 is shown coupled to the opening 202. The lateral insertion pocket 214 is adapted to accept a removable anchor block 220 illustrated in place in FIG. 2A, and separate from the pipe replacement device 200 in FIG. 2B. In operation, the towing cable is inserted through the opening 202 into the lateral insertion pocket 214 and the towing cable is guided laterally outward from the expander 212. The removable anchor block 220 is then attached to the end of the towing cable. Once attached, the removable anchor block 220 is seated back into the expander 212, where it fits within the lateral insertion pocket 214.

Due to high puling forces during a trenchless replacement operation, it can be difficult to remove a cable from the pipe replacement device 200 once the replacement is complete. Using configurations shown in the present disclosure, after a replacement operation, the removable anchor block 220 can be removed from the lateral insertion pocket 214 and disengaged from the cable with ease.

An attachment device 221 is shown within the removable anchor block 220. In one example, the attachment device 221 includes a tapered wedge tightener. In one example, the attachment device 221 is an active tapered wedge tightener, in contrast to a passive tapered wedge tightener that is tightened by pulling on the cable with friction to move the wedge segments. An actuator, such as the threaded fitting 224 is shown in FIG. 2B and FIG. 3. The threaded fitting 224 can be tightened down to press against wedge segments 222 to tighten against the cable.

In one example, the lateral insertion pocket 214 is located within a taper region of the expander 212. In the example shown, the removable anchor block 220 includes a surface 225 that aligns with a taper of the expander 212. In this configuration, expansion of the pipe to be replaced is more consistent due to the surface 225, and debris is substantially prevented from falling into the lateral insertion pocket 214.

FIG. 3 shows a cross section of the pipe replacement device 200 from FIG. 2A. In one example, illustrated in FIG. 3, a jack screw 226 is included. After a replacement operation, the jack screw 226 can be actuated to press against the removable anchor block 220 to drive it out of the lateral insertion pocket 214, if necessary.

FIG. 3 also shows additional detail of the cutter 216. Similar to examples described above, the cutter 216 is coupled to the expander 212 at a ball joint 211. As shown in the Figure, the ball joint 211 is held together by pressure along a towing cable (not shown), and the cutter 216 is removable/interchangeable by pulling the ball joint 211 apart.

FIG. 3 further shows a cutting blade 218 located in a pocket 219 of the cutter 216. The cutting blade 218 is removable for optional replacement, should the cutting blade become dull or damaged. FIG. 3 illustrates a hole 217 located opposite the cutting blade 218. In one example, the cutting blades 218 are attached within the pockets 219 using an adhesive such as epoxy. In practice, if a cutting blade is to be replaced, a punch or other small tool is inserted within one or more holes 217 opposite the cutting blade 218. The bond between the cutting blade 218 and the pocket 219 can then be broken by hammering or otherwise driving the cutting blade 218 out of the pocket 219 from the back side. Although one cutting blade 218 is shown, embodiments of cutters 216 including multiple cutting blades 218 are also within the scope of the invention.

Figure 4:
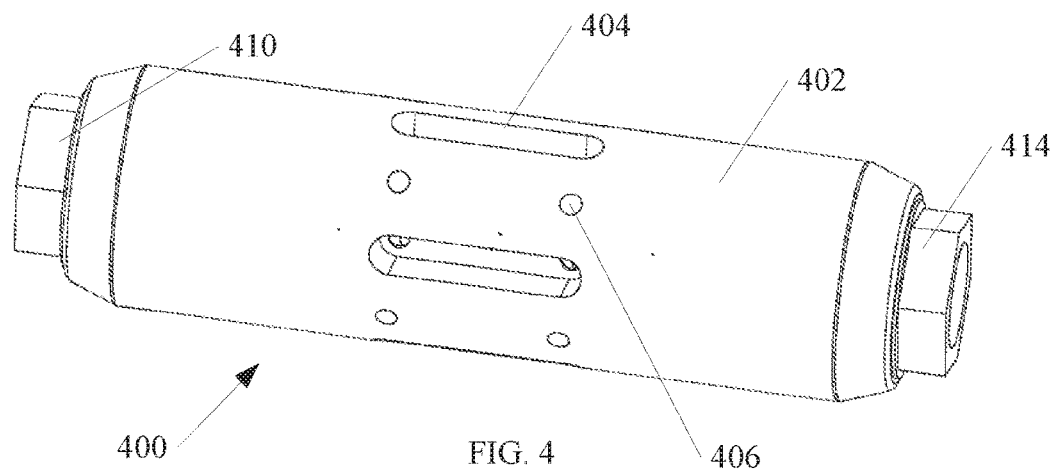
FIG. 4 shows a cutter according to an embodiment of the invention.
Figure 6:
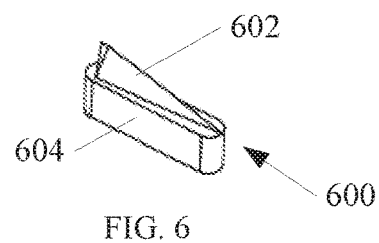
FIG. 6 shows a blade from a pipe replacement device according to an embodiment of the invention.

FIG. 4 shows a floating cutter 400 similar to the floating cutter 120 described above. The floating cutter 400 includes a body 402 having one or more pockets 404 adapted to accept cutting blades such as cutting blade 600 shown in FIG. 6. The cutting blade 600 includes an edge portion 602, and a mating portion 604 to closely fit within the pockets 404.

Also shown in FIG. 4 are a number of holes 406. In one example at least one hole is associated with a pocket 404 for removal of a worn or damages cutting blade 600 similar to the process described for cutter 216 described above. In the example of FIG. 4, two holes 406 are associated with each pocket 404 to more effectively drive a cutting blade 600 out for replacement.

In one example, the cutting blades 600 are attached within the pockets 404 using an adhesive such as epoxy. In practice, if a cutting blade is to be replaced, a punch or other small tool is inserted within one or more holes 406 opposite the cutting blade 600. The bond between the cutting blade 600 and the pocket 404 can then be broken by hammering or otherwise driving the cutting blade 600 out of the pocket 404 from the back side.

Figure 5:
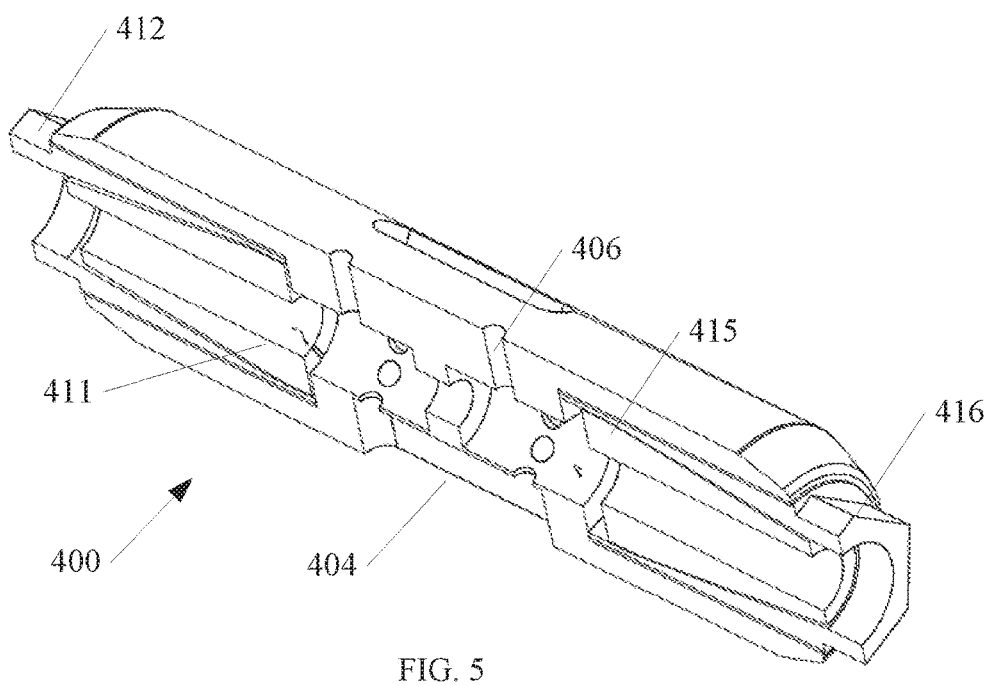
FIG. 5 shows a cross section of the cutter from FIG. 4, according to an embodiment of the invention.

FIG. 4 shows a first attachment device 410 and a second attachment device 414 coupled to ends of the floating cutter 400. In one example the first attachment device 410 and the second attachment device 414 both include tapered wedge couplers. FIG. 5 illustrates at least one tapered wedge segment 411 of the first attachment device 410, and at least one tapered wedge segment 415 of the second attachment device 414. As shown in FIG. 5, in one example, the first attachment device 410 and the second attachment device 414 are opposing in operational direction. Opposing attachment devices 410, 414 provide secure location of the floating cutter 400 at a chosen location along a towing cable. As a result of opposing attachment devices 410, 414, the floating cutter 400 cannot be slid axially along the towing cable in either direction when the attachment devices 410, 414 are actuated. Also shown in FIG. 5 is a first threaded fitting 412 to actuate the tapered wedge segment 411 of the first attachment device 410. Additionally, a second threaded fitting 416 is shown to actuate the tapered wedge segment 415 of the second attachment device 414.

As discussed above, splitting curved pipes such as polymeric natural gas lines can be problematic, and present a number of technical challenges. Curves in the pipe to be replaced cause increases in friction within the pipe and surrounding soil, and may require large pulling forces to advance a pipe replacement device such as described in embodiments above. Features such as a reciprocating hammer, a towing cable, jointed cutters, and floating cutters all provide enhancements to more effectively split old pipe, and advance new pipe into place as pulled behind the reciprocating hammer.

Figure 7A:
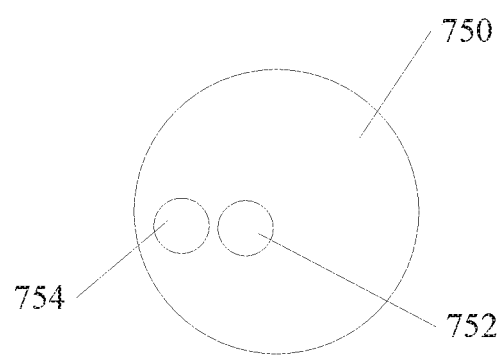
FIG. 7A shows a replacement pipe according to an embodiment of the invention.

In selected embodiments, the reciprocating hammer is a pneumatically driven hammer, with a supply of compressed air being supplied from a pneumatic supply hose located within the pipe to be replaced. In selected embodiments, a lubricant is also supplied from a lubricant supply hose routed alongside the pneumatic supply hose. FIG. 7A shows a cross section of a replacement pipe 750 including a pneumatic supply hose 752 and a lubricant supply hose 754. In one example the replacement pipe 750 includes polyethylene pipe. Other flexible polymeric pipes may also be used.

As illustrated in FIG. 7A, in one example, both supply hoses 752, 754 are located within the replacement pipe 750. In one example, the replacement pipe 750 is stored, ready for a job site, with the pneumatic supply hose 752 and lubricant supply hose 754 pre-installed within the replacement pipe 750.

Figure 7B:
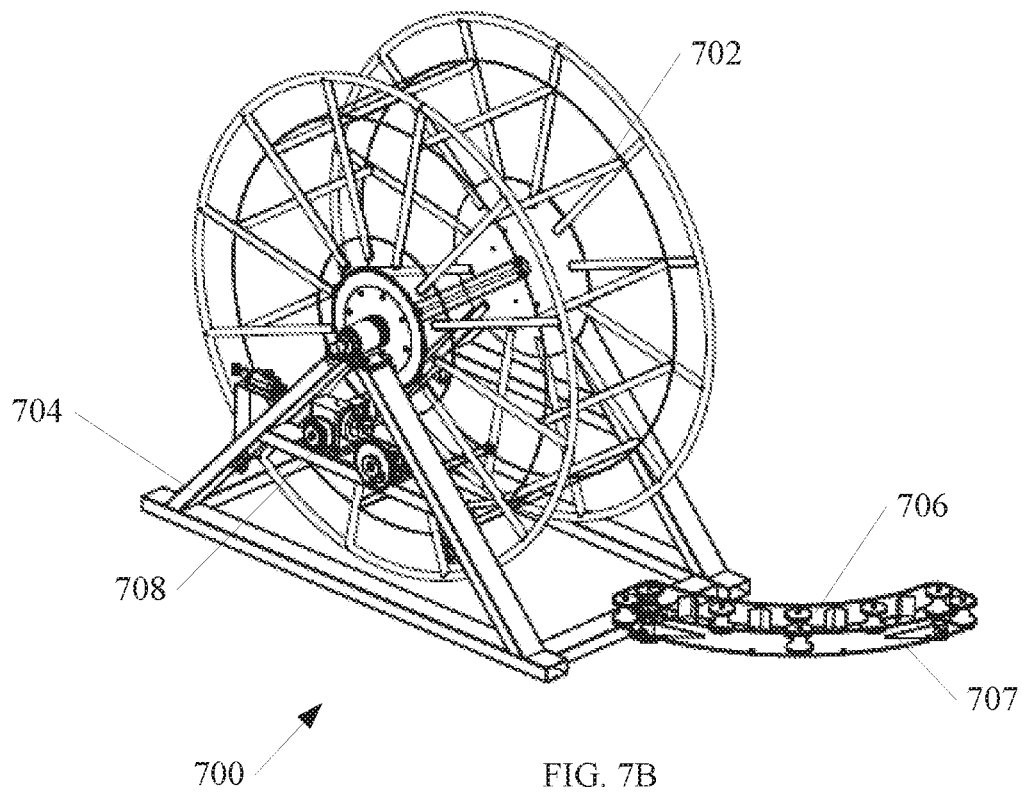
FIG. 7B shows a supply device according to an embodiment of the invention.

FIG. 7B shows a supply device 700 to hold an amount of replacement pipe such as replacement pipe 750. The supply device 700 includes a reel 702 and a frame 704 to hold the reel 702. In configurations where one or more supply hoses such as pneumatic supply hose 752 or lubricant supply hose 754 are pre-installed within the replacement pipe 750 a job site is much easier to navigate, and much less space in needed. The replacement pipe 750 does not need to be laid out to feed in hoses such as pneumatic supply hose 752 or lubricant supply hose 754 on site.

In one example, a motor 708 is located on the frame 704 of the supply device 700 to drive the reel 702 as needed. In one example, the motor 708 includes a hydraulic motor. A hydraulic motor is useful because other equipment located at the job site may also use hydraulic fluid for power. For example, a winch used to pull the towing cable may also use hydraulic drive.

In one example, a guide 706 is coupled to the frame 704 to direct the replacement pipe 750 from off of the reel 702 into an entry pit where the splitting and replacement operation begins. The guide 706 may include one or more rollers 707 to lower friction as the replacement pipe 750 is moved off the reel 702.

Figure 8:
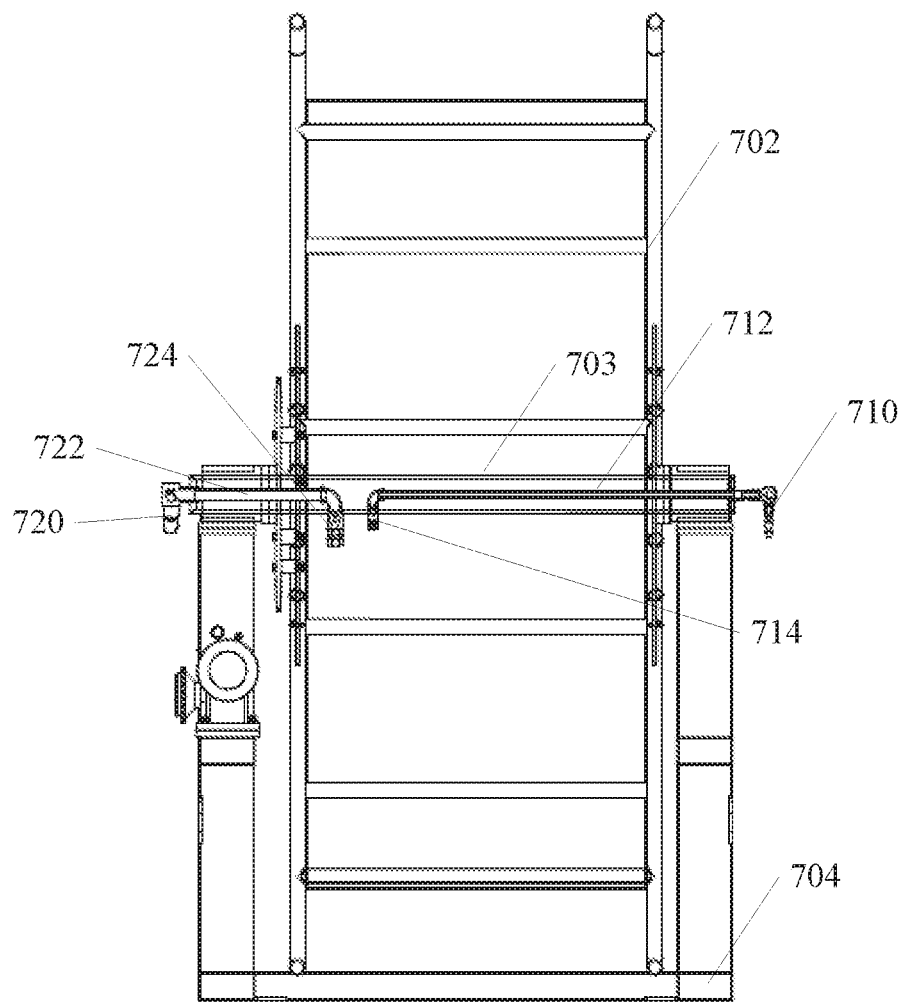
FIG. 8 shows a cross section of the supply device from FIG. 7, according to an embodiment of the invention.

FIG. 8 shows a cross section of the supply device 700 from FIG. 7B. A pneumatic supply line 712 and a lubricant supply line 722 are shown located within a hub 703 of the reel 702. A first pneumatic supply fitting 714 is shown in a location adapted for connection to the pneumatic supply hose 752 within the replacement pipe 750. A second pneumatic supply fitting 710 is shown in a location outside the hub 703, adapted for connection to a source of compressed air. A first lubricant supply fitting 724 is shown in a location adapted for connection to the lubricant supply hose 754 within the replacement pipe 750. A second lubricant supply fitting 720 is shown in a location outside the hub 703, adapted for connection to a source of lubricant. In one example, the lubricant includes a bentonite slurry, although other lubricants are also within the scope of the invention.

Because the pneumatic supply line 712 and the lubricant supply line 722 are located within the hub 703 of the reel 702, compressed air and lubricant can be delivered as needed, while replacement pipe is spooled off the reel, to pipe replacement devices such as examples 100, 200 described above.

Figure 9:
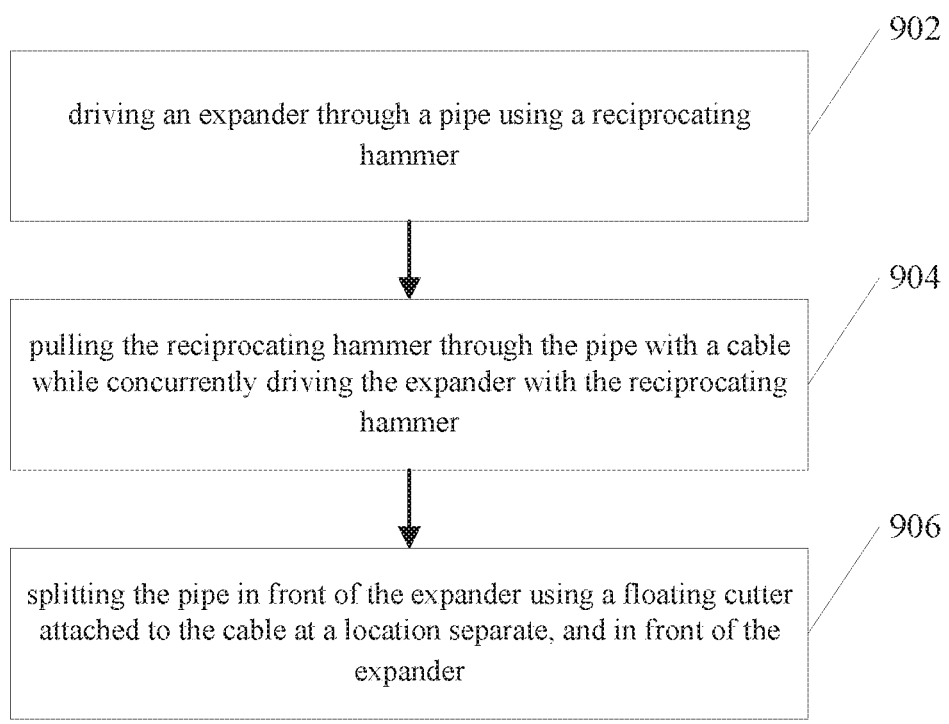
FIG. 9 shows a flow diagram of a method according to an embodiment of the invention.

FIG. 9 illustrates a flow diagram of an example method of trenchless pipe replacement according to an embodiment of the invention. Operation 902 recites driving an expander through a pipe using a reciprocating hammer. Operation 904 recites pulling the reciprocating hammer through the pipe with a cable while concurrently driving the expander with the reciprocating hammer. Operation 906 recites splitting the pipe in front of the expander using a floating cutter attached to the cable at a location separate, and in front of the expander. Other example methods further include splitting the pipe at a location adjacent to the expander, such as with a jointed cutter. Other example methods further include supplying lubricant and compressed air while splitting, wherein the lubricant and compressed air are supplied through supply lines stored within a replacement pipe. As described above, in one example, the replacement pipe is spooled off a reel, and the lubricant and compressed air are provided through fittings in a hub of the reel.

Although a particularly useful example of splitting old curved polymeric natural gas lines is used as an example in selected descriptions above, the invention is not so limited. Other trenchless replacement operations with other pipe materials such as copper, lead, or other metals are also possible.

While a number of advantages of embodiments of the invention are described, any lists of above mentioned advantages are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

I claim:

1. A replacement pipe supply device, comprising:
a reel coupled to a reel frame;
a length of replacement pipe wound around the reel;
a pneumatic hose pre-installed within the length of replacement pipe; and
a pneumatic supply line located within a hub of the reel.

2. The replacement pipe supply device of claim 1, further including a lubricant supply line located within the hub.

3. The replacement pipe supply device of claim 1, further including a guide coupled to the frame to direct replacement pipe off the reel.

4. The replacement pipe supply device of claim 3, wherein the guide includes one or more rollers.

5. The replacement pipe supply device of claim 1, further including a hydraulic motor coupled to the hub to rotate the reel.

6. The replacement pipe supply device of claim 1, further including a lubricant supply hose pre-installed within the length of replacement pipe.

7. A replacement pipe supply device, comprising:
a reel coupled to a reel frame;
a length of replacement pipe wound around the reel;
a lubricant supply hose pre-installed within the length of replacement pipe; and
a lubricant supply line located within a hub of the reel.

8. The replacement pipe supply device of claim 7, further including a guide coupled to the frame to direct replacement pipe off the reel.

9. The replacement pipe supply device of claim 7, wherein the guide includes one or more rollers.

10. The replacement pipe supply device of claim 7, further including a hydraulic motor coupled to the hub to rotate the reel.

* * * * *